United States Patent
Lear et al.

(10) Patent No.: US 12,091,968 B2
(45) Date of Patent: *Sep. 17, 2024

(54) SYSTEMS, APPARATUSES, AND METHODS FOR DETERMINING ROCK MASS PROPERTIES BASED ON BLASTHOLE DRILL PERFORMANCE DATA INCLUDING COMPENSATED BLASTABILITY INDEX (CBI)

(71) Applicant: Peck Tech Consulting Ltd., Montreal (CA)

(72) Inventors: Christopher Lear, Toowong (AU); Viktor Shlenchak, Longueuil (CA); Richard Pearson, Marieville (CA); Jonathan Phillip Peck, Magog (CA)

(73) Assignee: Peck Tech Consulting Ltd., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/209,697

(22) Filed: Jun. 14, 2023

(65) Prior Publication Data

US 2023/0323770 A1 Oct. 12, 2023

Related U.S. Application Data

(63) Continuation of application No. 16/951,116, filed on Nov. 18, 2020, now Pat. No. 11,713,677.

(Continued)

(51) Int. Cl.
*E21B 19/00* (2006.01)
*E21B 7/02* (2006.01)

(Continued)

(52) U.S. Cl.
CPC .............. *E21B 49/003* (2013.01); *E21B 7/02* (2013.01); *E21B 47/09* (2013.01); *E21B 47/12* (2013.01);

(Continued)

(58) Field of Classification Search
CPC .......... E21B 49/003; E21B 7/02; E21B 47/09; E21B 47/12; G01V 1/28; G01V 1/306; G01V 1/50; G01V 2210/16
See application file for complete search history.

(56) References Cited

U.S. PATENT DOCUMENTS

| | | | |
|---|---|---|---|
| 8,214,073 B2 | 7/2012 | Keskinen | |
| 8,230,927 B2 * | 7/2012 | Fairbanks | E21B 43/243 |
| | | | 166/372 |

(Continued)

FOREIGN PATENT DOCUMENTS

WO 2013/049124 A2 4/2013

OTHER PUBLICATIONS

"Use of Measurement While Drilling Techniques for Improved Rock Mass Characterization in Open-Pit Mines" by Mohammad Babaei Khorzoughi, Mater of Applied Science Thesis, the Faculty of Graduate Studies (Mining Engineering), University of British Columbia (Vancouver), Apr. 2013.

*Primary Examiner* — Elias Desta

(57) ABSTRACT

A system, apparatus, and method for determining intact versus fractured rock zones based on performance monitoring of an electric drilling machine when drilling a blasthole. The determination can be based on a calculation of compensated blastability index ("CBI") values using transformed performance monitoring data collected in real-time as the drilling machine drills the blasthole.

20 Claims, 4 Drawing Sheets

Related U.S. Application Data

(60) Provisional application No. 62/937,661, filed on Nov. 19, 2019.

(51) Int. Cl.
| | | |
|---|---|---|
| *E21B 47/09* | (2012.01) | |
| *E21B 47/12* | (2012.01) | |
| *E21B 49/00* | (2006.01) | |
| *G01V 1/28* | (2006.01) | |
| *G01V 1/30* | (2006.01) | |
| *G01V 1/50* | (2006.01) | |

(52) U.S. Cl.
CPC ............... *G01V 1/28* (2013.01); *G01V 1/306* (2013.01); *G01V 1/50* (2013.01); *G01V 2210/16* (2013.01)

(56) References Cited

U.S. PATENT DOCUMENTS

| | | |
|---|---|---|
| 8,616,277 B2 | 12/2013 | Backhaus et al. |
| 10,494,868 B2 * | 12/2019 | Stacy, II ............... E21B 44/04 |
| 11,035,219 B2 | 6/2021 | Orban |
| 11,299,981 B2 | 4/2022 | Nguyen et al. |
| 11,713,677 B2 * | 8/2023 | Lear ............... E21B 49/00 |
| | | 702/11 |
| 2007/0029112 A1 | 2/2007 | Li et al. |
| 2016/0053604 A1 | 2/2016 | Abbassian et al. |
| 2019/0257197 A1 | 8/2019 | Palmer et al. |

\* cited by examiner

SYSTEMS, APPARATUSES, AND METHODS FOR DETERMINING ROCK MASS PROPERTIES BASED ON BLASTHOLE DRILL PERFORMANCE DATA INCLUDING COMPENSATED BLASTABILITY INDEX (CBI)

CROSS-REFERENCE TO RELATED APPLICATION(S)

This application is a continuation of U.S. application Ser. No. 16/951,116, filed Nov. 18, 2020, which claims the benefit under 35 U.S.C. § 119(e) of Provisional App. No. 62/937,661, filed Nov. 19, 2019, wherein the entire content and disclosure of each is hereby incorporated by reference herein in their entirety.

TECHNICAL FIELD

The present disclosure relates to determining rock mass properties, and more particularly to systems, apparatuses, and methods for distinguishing between intact versus fractured rock zones based on monitored electrically powered blasthole drill performance data, which includes compensating a blastability index ("BI").

BACKGROUND

A drilled hole (the "blasthole") can be loaded with explosives that, once detonated, can create broken rock material, which when collected, transported, and processed enables the commercially viable extraction of ore minerals into finished products. To extract ore minerals in a commercially viable way in an open-pit mine, it can be helpful, if not necessary, to have detailed information on the characteristics of the inherent geology at the site. Specifically, the design and execution of a viable blast design that involves the correct choice and placement of explosives, can require accurate, three-dimensional, geospatial information (depth, thickness, X-Y location) regarding the presence of intact versus fractured rock zones in every blasthole in the blast design. Based on such information, explosives can be more precisely placed in intact rock zones versus in the location of fractured areas, to ensure the energy is more effectively applied to induce rock breakage.

Obtaining detailed information regarding the locations of fractured zones in a blasthole can be generally problematic, subject to manual and subjectivity as derived either from an operator's ability to sense (e.g., audible, vibration, and visual indicators), from geotechnical mapping (e.g., face, structural trends) or geophysical logging methods that need to be inserted into the blasthole post-drilling at additional cost and effort. In addition, the interpretation of these results to accurately identify fractured zones in a blasthole can be inaccurate, time consuming, and influenced by the skills and experience of the engineer or technician that conducts the analysis. As a result of these constraints, open pit mines may be discouraged to seek (e.g., on a routine basis) to collect intact versus fractured rock mass information per blasthole for use in blast design and explosive loading activities.

U.S. Patent App. Pub. No. 2019/0257197 ("the '197 publication") describes determining properties of rock formations using drill string vibration measurements, where vibration signals are transformed into transformed signals representing elastic response of the drill string, the rock formations, and borehole fluid to a filtered impulse originating at a known location along the drill string. According to the '197 publication, properties of the rock formations are calculated using the transformed signals. However, the '197 publication is not understood to describe calculating compensated blastability index ("CBF") values.

SUMMARY OF THE DISCLOSURE

In one aspect, a system for detecting and identifying presence and depth location of intact versus fractured rock zones when an electric drilling machine is drilling a blasthole in an open-pit mine using a tricone rotary bit is disclosed. The system can comprise a high sampling frequency data acquisition sub-system comprising hardware and firmware allowing the continuous, real-time collection of blasthole drill performance data from drilling machine-based electronic sensors while the drilling machine is drilling the blasthole; and a data analytics sub-system comprising a computing platform and embedded software allowing the processing, storage and transmission of acquired blasthole drill performance data which compensates one or more blastability index values for fractures based on the collected blasthole drill performance data in order to identify the presence and depth location of the fractured rock zones.

In another aspect, a method is disclosed. The method can comprise acquiring data from one or more sensors of an electric drilling machine; determining, using first processing circuitry, based on the acquired data, whether the electric drilling machine is operating in a drilling mode or a non-drilling mode; responsive to the drilling machine being determined to be operating in the drilling mode, processing the acquired data as the drilling machine operates in the drilling mode to drill a blasthole, for offload to second processing circuitry via a network; transforming, using the second processing circuitry, offloaded data from the first processing circuitry into predefined standardized units; processing, using the second processing circuitry, the transformed data, said processing including compensating a plurality of blastability index ("Br") values for fractures based on the transformed data in order to determine fracture and intact zones of the blasthole; and storing, in computer memory, data corresponding to the determined fracture and intact zones for the blasthole.

And in another aspect, a non-transitory computer-readable storage medium storing computer-readable instructions that, when executed by one or more computers, cause the one or more computers to perform a method is disclosed. The method can comprise acquiring data from one or more sensors of an electric drilling machine; determining based on the acquired data, whether the electric drilling machine is operating in a drilling mode or a non-drilling mode; responsive to the drilling machine being determined to be operating in the drilling mode, processing the acquired data as the drilling machine operates in the drilling mode to drill a blasthole, for offload to second processing circuitry via a network; transforming offloaded data from the first processing circuitry into predefined standardized units; processing the transformed data, said processing including compensating a plurality of blastability index ("B") values for fractures based on the transformed data in order to determine fracture and intact zones of the blasthole; and storing, in computer memory, data corresponding to the determined fracture and intact zones for the blasthole.

Other features and aspects of this disclosure will be apparent from the following description and the accompanying drawings.

DETAILED DESCRIPTION

Embodiments of the disclosed subject matter involve determining rock mass properties, and more particularly to systems, apparatuses, and methods for distinguishing between intact versus fractured rock zones based on monitored electrically powered blasthole drill performance data, which can include determined compensated blastability index ("CBI").

Figure 1:
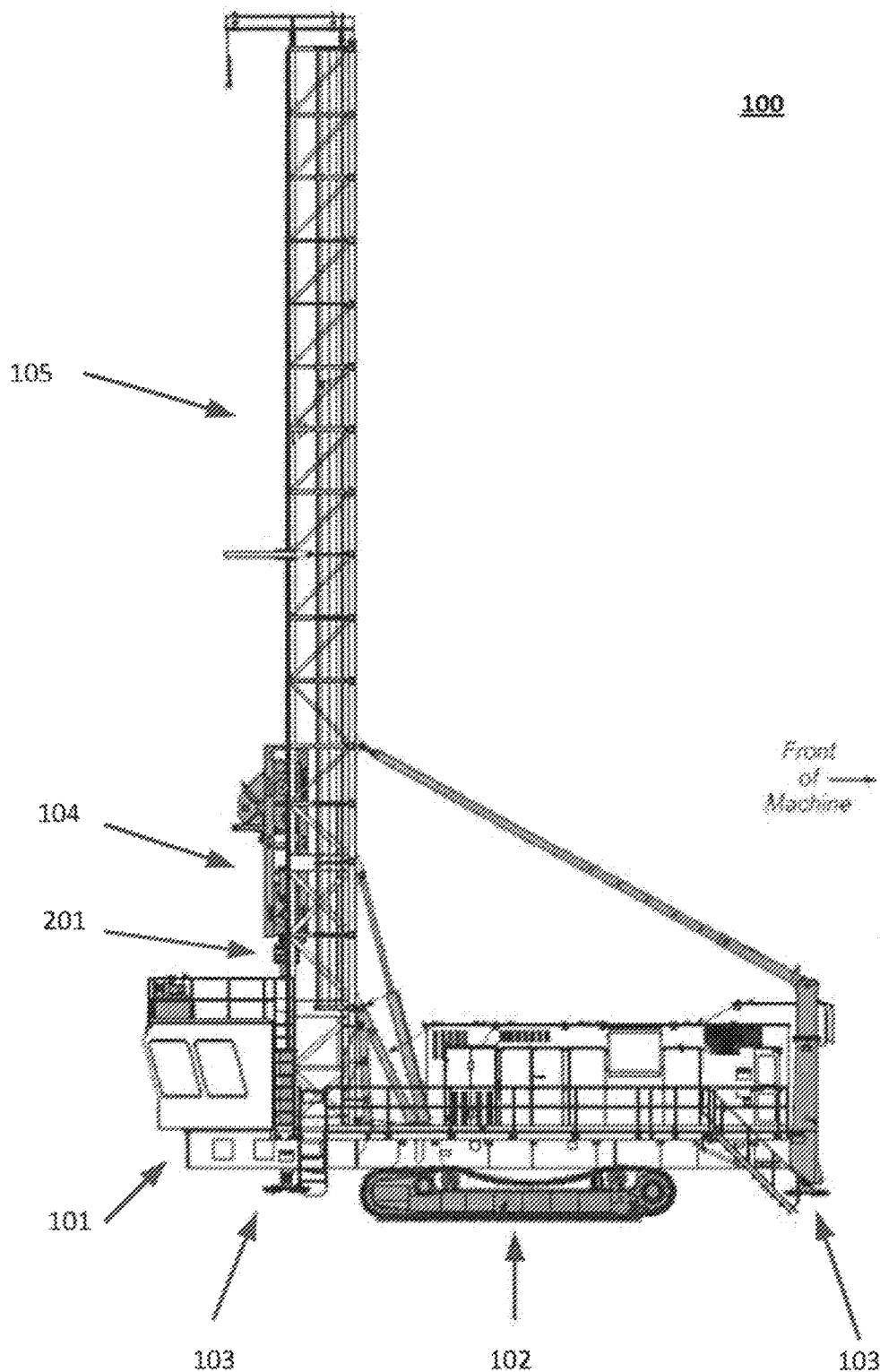
FIG. 1 shows a side view of an electric drilling machine according to one or more embodiments of the disclosed subject matter.
Figure 2:
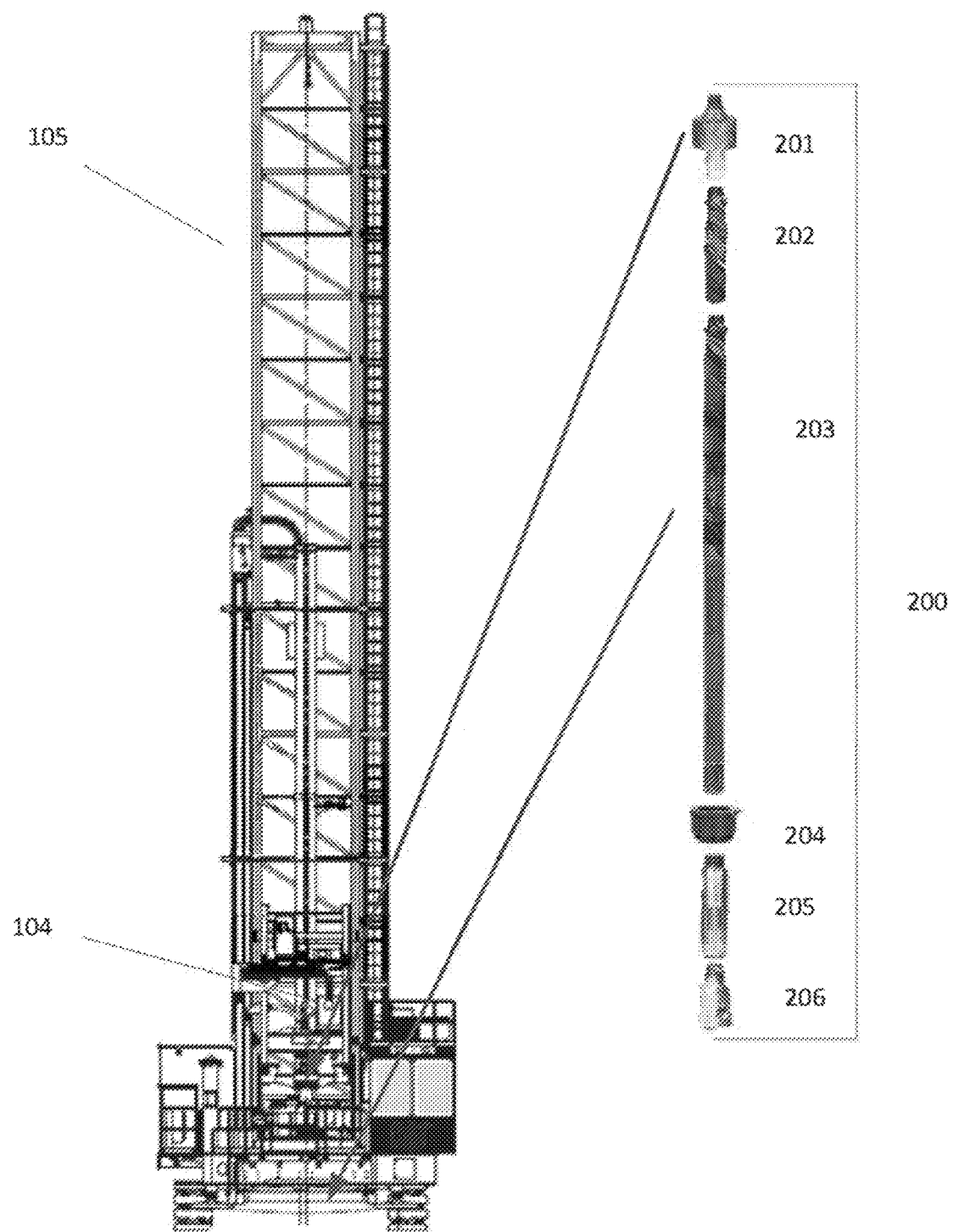
FIG. 2 shows a rear view of an electric drilling machine according to one or more embodiments of the disclosed subject matter.

FIG. 1 and FIG. 2 show representations of an electric drilling machine 100 according to embodiments of the disclosed subject matter. Generally, the drilling machine 100 can be used to drill a hole into intact rock using a rotary tricone drill bit 206. The hole may be referred to as a borehole or a blasthole, and may be filled with explosive and non-explosive materials for the purpose of fragmenting and breaking the intact rock material in the vicinity of the hole. The positioning of the explosive materials in the blasthole may be selective in nature, for instance, to achieve the required blast outcome (e.g. rock fragmentation, blast movements and muckpile diggability).

The electric drilling machine 100 can be comprised of a frame or chassis 101 provided on a crawler traction system 102, such as a set of tracks, to move the electric drilling machine 100. The electric drilling machine 100 can also have a set of leveling jacks 103 that can be individually adjusted to level (e.g. make horizontal) the frame or chassis 101 prior to the start of drilling to create a vertical blasthole.

The electric drilling machine 100 can have a tower 105 operatively coupled to the frame or chassis 101, which can be used to support (including raise and lower) a drill string assembly 200, which may be comprised of drill pipe 203 and drill pipe extender 202. A rotary tricone drill bit 206 can be provided at a bottom end of the drill string assembly 200, and a rotary drill head 104 can be provided at a top end of the drill string assembly 200. The drill string assembly 200 rotates through a deck bushing 204 to align and guide the drill pipe 203 and an optional shock sub 201 may be added to the drill string assembly 200 to absorb axial and transverse vibrations generated by the rotation of the drill string assembly 200 and rock breakage mechanisms at the interface between the intact rock and the rotary tricone drill bit 206. The drill string assembly 200 may also include a drill bit stabilizer 205 between the rotary tricone drill bit 206 and drill pipe 203 to stabilize rotation of the drill bit 206.

Generally, the rotary drill head 104 can apply pulldown pressure and rotate the drill string 200 based on operation of one or more electric motors-operatively coupled to or as part of the rotary drill head 104 and tower 105 assembly. Hence, according to embodiments of the disclosed subject matter the drilling machine 100 can be characterized as an electric drilling machine 100. Hence, the drilling machine 100 can control the drill string assembly 200 to rotate so as to progressively break the intact rock material using the rotary tricone drill bit 206 attached to the end of the drill string assembly 200 while under an applied axial (vertical) load.

Figure 3:
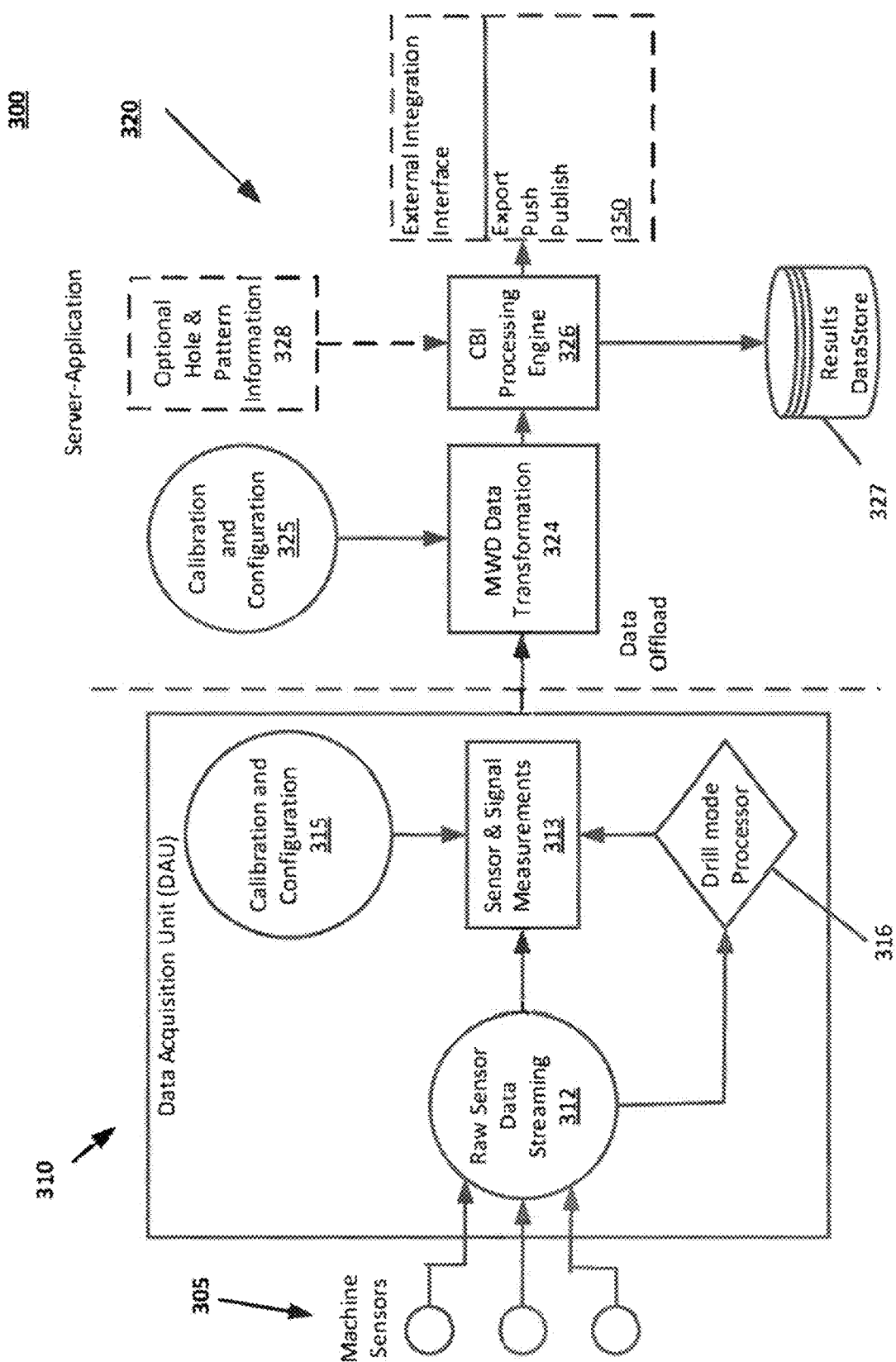
FIG. 3 is a block diagram of a system according to one or more embodiments of the disclosed subject matter.

Turning to FIG. 3, this figure shows a system 300 according to embodiments of the disclosed subject matter. Of course, embodiments of the disclosed subject matter are not limited solely to the delineations set forth in FIG. 3 regarding acquisition and processing arrangements.

Generally, the system 300 can acquire and record data, in real time, regarding performance of the drilling machine 100 when the drilling machine 100 is operating in a drilling mode (i.e., drilling a blasthole in intact rock material) and process such acquired data into compensated blastability index ("CBI") data. Such CBI data provided by the system 300 can be used as an input for blast design applications, such as where to accurately place explosive charges for one blasthole or a set of blastholes drilled by the drilling machine 100.

System 300, which can be implemented, at least in part, on the drilling machine 100, can be comprised of a data acquisition unit (DAU) 310 and server module 320. According to one or more embodiments, the DAU 310 can be provided locally at the drilling machine 100, for instance, as part of the drilling machine 100, and server module 320 can be remote from the DAU 310 (and the drilling machine 100). The server module 320 can be a back office system (e.g., server), which may be communicatively connected to the DAU 310 via a wireless network using communication components associated with the DAU 310, where such communication components may be part of the drill machine 100.

System 300 also can include or otherwise interface with one or more sensors 305 of the drilling machine 100. Such one or more sensors 305 can include sensor(s) adapted to sense or measure operating characteristics or parameters of the drilling machine 100 during a drilling operation of the drilling machine 100. For instance, such sensor(s) 305 can sense the vertical displacement (e.g. in inches or centimeters, feet or meters) of the drill assembly 200 for conversion into depth of the rotary tricone drill bit 206 in the blasthole (e.g. feet or meters) and depth of cut (DOC), rotary speed (e.g., in rpms based on monitoring electric motor voltage), rate of penetration (ROP in feet per hour), torque (TRQ in ft-lbs based on monitoring electric motor current), pulldown pressure (hoist pull down force in lbf)—as the rotary tricone drill bit 206 descends through the intact rock material. Some or all of the signals from the sensor(s) 305 may be characterized as Monitor-While-Drilling (MWD) signals. Regarding the foregoing, the outputs from the sensor(s) 305 to the DAU 310 can be analog, digital, or a combination of the two.

The DAU 310 may be implemented using a processor or processing circuitry, implemented in hardware, software, or a combination of the two Generally, the DAU 310 can provide reliable data from the sensor(s) 305 even in light of possible cumulative noise that may be present within the acquired time-series data due to acquisition systems (e.g., electronic acquisition systems) as well as the complex breakage mechanisms occurring at the rock-bit interface along with the effect of progressive rotary tricone drill bit 206 wear.

The DAU 310 can acquire or sample the data from the sensor(s) 305 at a relatively high rate, for instance, 200 Hz (i.e., every 0.005 second), as the rotary tricone drill bit 206 rotates and descends through the rock material, via interface 312. According to one or more embodiments, the sampling frequency can be configurable/reconfigurable according to the particular application. Such sampling frequency can be sufficient to prevent or minimize data aliasing. Additionally, according to one or more embodiments, the acquiring frequency may be greater than a frequency or frequencies required for rock property (i.e., intact or fractured) identification. The DAU 310, via interface 312, can thus repeatedly acquire machine performance measurements from the sensor(s) 305 for specific drill parameters of the drilling machine 100 at respective current depths of the rotary tricone drill bit 206 as the rotary tricone drill bit 206 descends through the rock material. In that the data from the sensor(s) 305 can be sampled at a relatively high frequency (or frequencies), the data can be provided as raw time-series data stream of sufficiently high granularity.

Data from the interface 312, i.e., data from the sensor(s) 305, can be provided to a measurement module 313 of the DAU 310. The measurement module 313 can include memory. Hence, the data from the sensor(s) 305 can be stored in the memory of the measurement module 313, at least temporarily, for retrieval, processing, and eventual output from the DAU 310, for instance, to offboard the DAU 310 to a location remote from the drilling machine 100, such as the server module 320.

Optionally, the DAU 310 can include a calibration and/or configuration module 315. Such calibration/configuration module 315 can be used to configure and/or calibrate the processing of the measurement module 313 according to the particular application and/or type of drilling machine 100. For instance, calibration/configuration module 315 can set or define the specific signals for which the measurement module 313 is to process and/or can define parameters or constraints for the specific signals based on a consumable (e.g., rotary tricone drill bit 206 force limitations), the type of rock material, and/or preference (e.g., of an operator) for operational control of the drilling machine 100.

According to one or more embodiments, the DAU 310 can include a drill mode feature or module 316 to determine whether the drilling machine 100 is operating in a drilling mode or a non-drilling mode (i.e., drilling or not drilling). Such determination can be based on the drilling environment or context. In this regard, the DAU 310, via the measurement module 313 based on input from the drill mode module 316, can selectively process data, for instance, only process the data from the sensor(s) 305 when the drilling machine 100 is in the drilling mode. For instance, the measurement module 313 can begin processing (e.g., recording) the data from the sensor(s) 305 when the drill module 316 determines that drilling has commenced and stop processing (e.g., recording) when the drill module 316 determines that the drilling has stopped. Upon the stopping of the drilling (e.g., because an entirety of the blasthole has been drilled), the data may be saved in one or more files, at least initially at the DAU 310. As alluded to above, such data may be offloaded from the DAU 310, for instance, to the server module 320. Moreover, such data can be offloaded on a per-blasthole basis, i.e., after each blasthole is drilled, or on as a group of data for some or all of the blastholes for a particular area or project.

The data offloaded from the DAU 310 can be provided to a Monitor-While-Drilling (MWD) module 324. Generally, the MWD module 324 can perform processing and convert each or combination of the signals from the DAU 310, the parameter measurements, to specific advantageous engineering units and values, according to desired conversion aspects. Such engineering units and values may be characterized as "standard" and/or "real" engineering values or units, that can represent meaningful information for further processing to identify the rock hardness and intact versus fractured rock intervals. For instance, the engineering units may reflect parameters at the rotary tricone drill bit 206 interface (e.g., pulldown pressure or force at the interface) with intact rock rather than more broadly defined parameters (e.g., overall pulldown pressure or force of the drill string 200). Optionally, some or all of the converted engineering units may be standardized gaussian values. Regarding the foregoing discussion of MWD data, it is noted that reliable calculation of rock properties is more likely to be achieved when the MWD data used are reliable measurements of the real drill input and response parameters while drilling.

The MWD module 324, according to one or more embodiments, can apply signal conditioning (e.g., smoothing by weighted average) on each parameter measurement to obtain a more reliable measurement of the parameter at the current depth in order to convert to the specific desired engineering unit. As an example, in order to take advantage of the relatively high granularity of the MWD data, each MWD signal can be smoothed, via the MWD module 324, for instance, using a configurable moving average with a sliding window of weighting elements. The weights can be normalized, and the window can be centered at the middle point (the highest weight is attributed to the middle point). In this regard, for instance, let $X_i$ represent the entry i (ranked by increased depth) of a given MWD signal (e.g., Torque, WoB . . . ), and $X_i^{av}$ is the averaged signal corresponding to that entry i, then the associated weights:

$$X_i^{av} = \sum_{k=i-100}^{i+100} w_k X_k, \text{ where}$$

$$\sum_{k=i-100}^{i+100} w_k = 1 \text{ and } w_k = \frac{4}{(n-1)^2}\left[\frac{n-1}{2} - \left|\frac{n+1}{2} - k\right|\right].$$

Optionally, the size of the sliding window may be dynamically adjusted. For example, for a transient signal the sliding window may be adjusted to a smaller size than when the signal is a steady state signal. Also, the number of weighting elements is relative to the amount of data in the depth window. In another instance and given a geological context, when exploiting the correlations between signals and rock properties the MWD module 324 may use fixed window size.

This aggregate function can result in a smoothing of the signal that can help in reducing signal variability and mitigate potential outlier values.

Optionally, a calibration and/or configuration module 325 can be provided, for instance, as part of the server module 320. Such calibration/configuration module 325 can be used to configure and/or calibrate the processing of the MWD module 324 according to the particular application and/or type of drilling machine 100. For instance, calibration/configuration module 325 can set or define the specific signals from the DAU 310 for which the MWD module 324 is to process and/or can define parameters or constraints for the specific signals based on a consumable (e.g., rotary tricone drill bit 206 force limitations, diameter), static weight of the rotary drill head 104 and drill string assembly 200, the type of rock material, and/or preference (e.g., of an operator) for operation of the drilling machine 100.

An application running on a server, referred to as server module 320, can include a CBI processing module 326 that can receive the output(s) of the MWD module 324. As noted above, reliable calculation of rock properties is more likely to be achieved when the MWD data used are accurate measurements of the real parameters, as provided by the MWD module 324. Hence, the CBI processing module 326 can obtain from the MWD module 324 meaningful information specifically needed to determine CBI values for the blasthole.

Regarding context for CBI values, time-series data acquired from monitoring the performance of the drilling machine 100 when plotted to depth exhibit very distinct signal responses in the presence of intact versus fractured rocks that can be used for their discrimination. To eliminate the signal interpretation subjectivity, in one or more embodiments, methods and techniques may be applied to time-series data to automate such a process. These methods and techniques may include the calculation of new variables such as coefficients of variation of the MWD signals, which represent a measure of the signal variability. The intent is to better understand the influence on some of the operational parameters that are being recorded when drilling in intact rock versus fractured rock and to enable compensation for and correction to induced signal errors that may skew the CBI value results.

Based on production of a combined output of sensor(s) 305 of the drilling machine 100 in the form of a specific fracture energy (SFE) value, also known as specific energy of drilling (SED), which can exhibit a relatively strong correlation to rock hardness at a specific depth location in a blasthole, CBI, at least in some respects, may be characterized as an extension of SFE. Generally, CBI values can enable accurate identification of the presence of fractures and other discontinuities within an otherwise intact rock mass. CBI data can be viewed as composite indicator that can better reflect the in situ rock hardness through the incorporation of both identified intact and fractured zones. In this regard, fractured areas may tend to exhibit a significantly lower rock hardness/CBI value versus harder, more intact rock zones, thus allowing for their ready discrimination.

Optionally, the server module 320 can acquire hole and pattern information from a hole/pattern data source 328 providing identification and other optional details of the blasthole when CBI and/or SFE values are written to data storage 327.

The Compensated Blastability Index (CBI) compensates for the fractures contained in the rock mass. The Blastability Index (BI) itself may be a unitless number typically ranging from 0 and 100. The BI is defined and calculated by normalising the Specific Fracture Energy (SFE) by a value representing the highest rock strength to be encountered by the drill at a given mine site. The SFE is based on a known algorithm (based on Teale, 1965) for rotary drilling that assumes 100% efficient transfer of power from the electric drill's drive motors to induce rock fracture at the rock-bit interface.

The presence of fractures contained in a rock mass may be defined by the magnitude of fracture, in particular, a Fracture Reduction Factor (FRF). Rate of Penetration (ROP) can be used as a response measure of the hardness of the rock. The FRF is based on a parameter that considers the relationship between ROP, and two controlled inputs, Weight on Bit (WOB) and Rotational Speed (RPM). The parameter may be calculated over various window lengths to determine the variability of change down the blasthole.

Parameters in adjacent windows may be compared as a ratio rMAW (Moving Average Window), for a given interval depth, D, and window length, j, which may be less than a threshold t.

$$rMAW_D[j = 1, 3]] = \begin{bmatrix} MAW_D[j]/MAW_D[j+1] < t \\ 1. \end{bmatrix}$$

The FRF is defined as the product of the ratios of adjacent windows rMAW, which results in a value that is less than or equal to 1.0. The FRF may also be based on parameters that are adjusted to account for bit diameter.

$$FRF_D = \prod_{j=1}^{3} rMAW_D[j]$$

The CBI may be defined as the Blastability Index (BI) compensated (or down-rated) by the magnitude of the Fracture Reduction Factor (FRF).

$$CBI_D = BI_D * FRF_D$$

In one or more embodiments, the units of the CBI may depend on how normalization of the BI is implemented at the given mine site.

The outputs of the CBI processing module 326 can be provided for output by way of an external integration interface 350 via the CBI processing module 326.

Based on the CBI data from the CBI processing module 326, a blasting module, by way of the external integration interface 350, may determine (e.g., automatically) a blasting pattern, for instance, timing and/or placement, regarding blasting charges providing in one or more blastholes. Optionally, the blasting module may identify (e.g., automatically) where one or more additional blastholes should be drilled to fit into a current blasting pattern of current one or more blastholes.

Industrial Applicability

As noted above, embodiments of the present disclosure relate to determining rock mass properties, and more particularly to systems, apparatuses, and methods for distinguishing between intact versus fractured rock zones based on monitored electrically powered blasthole drill performance data, which can include determined compensated blastability index ("CBI"). In this regard, as context for CBI processing according to embodiments of the disclosed subject matter, it is noted that production blasthole drills often drill through highly variable geological conditions, and along with the effect of progressive rotary tricone drill bit 206 wear at the bit-rock interface, can introduce a complex interplay of noise into the monitored drill performance data.

According to one or more embodiments, systems and methods can enable a capability to automatically detect the presence of intact versus fractured rock zones in a blasthole while drilling, for instance, with no a-priori information. Such systems and methods to detect these intact and fractured rock zones can use drill performance data acquired from a suite of electronic sensors on the drilling machine 100 using a relatively high frequency data acquisition platform (for example, sampling at a high frequency of about 200 Hz) and data processing and analysis techniques.

Embodiments of the disclosed subject matter can be comprised of a data collection module, such as DAU 310 (which may be referred to as a Data Acquisition Unit or DAU), and a server module 320, which can comprised of a plurality of individual modules or collected submodules, such as shown in FIG. 3, wherein the DAU 310 can acquire, process and store analog and/or digital inputs from sensor(s) 305 on the drilling machine 100, the sensor(s) used to provide performance data and other feedback on the status of the drilling machine 100, while the drilling machine 100 is drilling, and the server module 320, which may be referred to as a back office system (e.g., one or more servers) that can then process the acquired drill data into compensated blastability index ("CBI") values for their subsequent integration to a blast design software application.

To contend with the highly variable nature of the geology, drilling process and noise inherent to acquired performance data (from sensor(s) 305 of the drilling machine 100), embodiments of the disclosed subject matter can utilize proprietary and advanced data processing and analysis techniques to enable accurate discrimination of intact versus fractured rock zones using MWD data acquired from granular and highly sampled (e.g., 200 Hz) data from the sensor(s) 305 of the drilling machine 100 using the DAU 310. Subsequent CBI processing, for instance, via the CBI processing module 326, can leverage the MWD data (i.e., transformed acquired drilling sensor data captured while the drilling machine is drilling), using a variety of advanced techniques to filter, process and accurately identify the presence of intact versus fractured rock zones within a blasthole.

Thus, the present disclosure, at least in some respects, can relate to a computer-based system and method that automatically and precisely identifies, in post-processing (i.e., other than real time), the presence of intact versus fractured rock zones (naturally present or induced due to previous blasts), substantially vertically and/or horizontally in an open-pit mine. The system and method can use advanced processing algorithms that are applied to a range of time-series data acquired from sensor(s) 305 that monitor one or more physical performance variables of the drilling machine 100, such as current, voltages, pressures, vibrations, speed, and/or depth location of the drilling machine 100 while drilling blastholes in an open-pit mine.

According to one or more embodiments, a system that is based on highly granular MWD data (e.g., sampled at or about 200 Hz) acquired from the performance monitoring of an electrically powered blasthole drilling machine, also referred to as an electric drilling machine, permits the accurate identification of the presence of zones of intact versus fractured rock materials when using a rotary tricone drill bit 206. Such system, according to embodiments of the disclosed subject matter, may be characterized as a compensated blastability index ("CBI") and can operate according to the following: utilize an integrated high frequency data acquisition and computing platform to collect sensor measured drill performance data and other contextual process information (for example control set-points) as the basis for identifying the presence of intact versus fractures rock zones within a vertical blasthole; utilize software that is deployed in a back office environment for processing the acquired drill data from a data collection module, such as DAU 310, into CBI values that, based on their magnitude to depth, can allow for the identification of intact versus fractured rock zones within a vertical blasthole; and optionally export CBI data output to an external blast design software application for use in explosive loading designs towards maximizing the blast outcomes in terms of more optimal fragment size distribution and muckpile diggability.

As one specific example, a CBI system or method according to embodiments of the disclosed subject matter can be deployed, at least in part, relative to an electric drilling machine, such as drilling machine 100 The CBI system, such as system 300, can be configured to and indeed operate as follows: acquire repeated machine performance measurements from electronic sensors for specific drill parameters at the current depth, where the recorded measurement frequency is always higher than the desired frequency for intact versus fractured rock zone identification, detect when in drilling (versus non-drilling) mode based on context provided from a data collection module, such as DAU 310; and apply a signal correction (smoothing by weighted average) on each parameter measurement to derive a measurement of the parameters that better reflect the machine performance (e.g., by suppression of noise) at the current depth and convert the different electrical measurements into a standardized set of mechanical/physical inputs at the rotary tricone drill bit 206 along with supporting information pertaining to the blasthole.

Such signal-corrected and converted signals can form some or all of the basis for input(s) to a CBI processing module, such as CBI processing module 326, which ultimately can identify and record intact and fractured rock zones associated with the drilling of a blasthole, for the subsequent determination of the placement of one or more blast charges in the blasthole. That is, blasting engineers can use the CBI values calculated within a group of blastholes, for instance, to input such values to a blast design software application, such as a blasting module, by way of the external integration interface 350, to tailor the blast energy respective of intact and fractured zones that are pervasive horizontally and vertically (i.e., among some or all of the blastholes). The resulting CBI data can optionally be combined with pre-existing orebody knowledge and subsequently used for the design of a more accurate and efficient blast pattern design that is aimed liberating the orebody rock materials in an efficient and cost effective manner whilst also optimizing the subsequent downstream processes.

Figure 4:
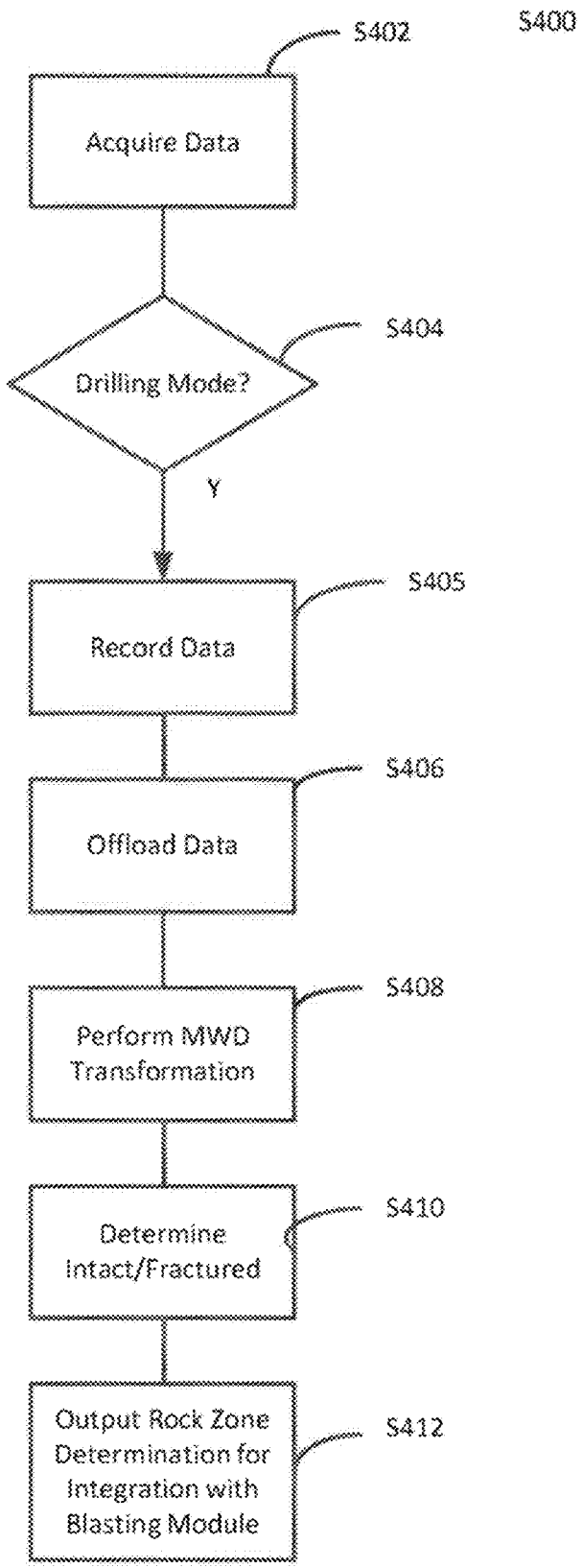
FIG. 4 is a flow chart of a method according to one or more embodiments of the disclosed subject matter.

FIG. 4 is a flow diagram of a method 400 according to embodiments of the disclosed subject matter.

The method 400 can be performed by or under control of the system 300. According to one or more embodiments, the method 400 can be implemented by or according to computer-readable instructions stored on a non-transitory computer-readable storage medium that, when executed by one or more computers, such as processing modules (e.g., circuitry) described herein, perform the method 400.

The method 400, at operation S402, can acquire data from one or more sensors 305, according to a relatively high sampling rate (e.g., at or about 200 Hz), such as described above.

The data may be processed, for instance, by measurement module 313, optionally based on input from a drill mode module 316, to determine whether the drilling machine 100 is operating in a drilling mode whereby drilling of rock material is taking place, at S404. The method 400 may not proceed with substantive processing by the measurement module 313 until the drill mode module 316 determines, based on the sampled data from the interface 312, that the drilling machine 100 is in a drilling mode (e.g., drilling mode, as well as re-drilling mode). Thus, the DAU 310 may substantively process and at S405 record the collected data from the sensor(s) 305 when the drilling machine 100 is drilling.

At S406 the DAU 310 can offload data collected and processed during the operation of the drilling machine 100. Such data may be offloaded periodically, such as on a per-blasthole basis once all drilling data has been acquired, processed, and recorded, or as the drilling machine 100 drills the blasthole. Alternatively, data from a group of drilled blastholes (e.g., all blastholes for a given area) may be offloaded. The data can be offloaded to a data processing module, such as server module 320 via a wireless network, or to a removable memory device via an output port. Still further, DAU 310 includes onboard storage that allows to record many files even if offload is temporary unavailable, and therefore to prevent data loss.

At S408 the method 400 can transform the data from the sensor(s) 305 as noted above, for instance according to preprocessing and transformation into a standardized unit providing a realistic nature of the raw data for further processing, such as described herein. The processing at S408 can be performed by MWD module 324, for instance. Moreover, the processing at S408 can be performed after the drilling machine 100 has completed drilling a particular blasthole or after drilling multiple blastholes. Alternatively, the processing at the MWD module 324 can be performed as the data from the DAU 310 is received, though not necessarily in real time.

At S410, the method 400 can process the MWD data from the MWD module 324 to determine whether zones of a blasthole (or blastholes) are fractured or intact. Such processing includes calculation of one or more compensated blastability index ("CBI") values for each blasthole by a CBI processing module, such as CBI processing module 326. It is noted, that although the term "compensated" has been used for the method of determining whether the zones are fractured or intact, other terms may be used to describe this method without departing from the scope of this invention. In one or more embodiments, data used to determine whether the zones are fractured or intact may be provided by hole/pattern module 328, for instance.

At S412, the method 400 can output the rock zone determinations, i.e., intact versus fractured zones, for one or more blastholes. Such output can be on a per-blasthole basis or on a group-of-blastholes basis. The rock zone determinations can be provided to a blast design software application, such as blasting module, to determine the type and placement of one or more explosive charges for the blastholes.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A system for detecting and identifying presence and depth location of intact versus fractured rock zones when an electric drilling machine is drilling a blasthole, the system comprising:
high sampling frequency data acquisition circuitry comprising hardware and firmware configured to implement continuous, real-time collection of blasthole drill performance data during drilling using one or more machine-based electronic sensors while the electric drilling machine is drilling the blasthole; and
data analytics circuitry comprising a computing platform and embedded software configured to process, store, and transmit acquired blasthole drill performance data which compensates a plurality of blastability index ("BI") values for fractures based on the collected blasthole drill performance data in order to identify the presence and depth location of the fractured rock zones,
wherein the high sampling frequency data acquisition circuitry is configured to offload the acquired blasthole drill performance data to the data analytics circuitry,
wherein the data analytics circuitry is configured to transform the offloaded acquired blasthole data from the high sampling frequency data acquisition circuitry into predefined standardized units, and
wherein the data analytics circuitry is configured to process the transformed data, the processing including compensating the plurality of blastability index ("BI") values for fractures based on the transformed data in order to determine fracture and/or relative hardness of intact zones of the blasthole.

2. The system of claim 1, further comprising the one or more machine-based electronic sensors, which are deployed on the electric drilling machine.

3. The system of claim 1, wherein the drilling of the blasthole by the electric drilling machine is in an open-pit mine using a tricone rotary bit.

4. The system of claim 1, wherein the data analytics circuitry is configured to store, in computer memory, data corresponding to the determined fracture and/or relative hardness of intact zones in the blasthole.

5. The system of claim 1, further comprising a wireless communication network communicatively connecting the high sampling frequency data acquisition circuitry and the data analytics circuitry.

6. The system of claim 1, wherein the high sampling frequency data acquisition circuitry offloads all of the acquired blasthole drill performance data to the data analytics circuitry after a drilling operation for the electric drilling machine has been determined to have stopped and the blasthole has been completed.

7. The system of claim 1, wherein the high sampling frequency data acquisition circuitry offloads at least some of the blasthole drill performance data to the data analytics circuitry as the drilling operation for the electric drilling machine is being performed.

8. The system of claim 1, further comprising a software tool to perform post-processing of the blasthole drill performance data to be used to determine a blast charge pattern including a type and placement of one or more explosive charges for the blasthole.

9. The system of claim 8, wherein the blast charge pattern is formed of a plurality of blastholes drilled by the drilling machine, including said blasthole, and for subsequent specification of blast charge positioning in each of the plurality of blastholes.

10. The system of claim 1, wherein the data analytics circuitry includes a back-office computer-based server.

11. The system of claim 1, wherein the processing to determine the fracture and/or relative hardness of the intact zones is based on previous blasthole and/or pattern information and/or geological information applied to refine the compensating the BI values.

12. A method for detecting and identifying presence and depth location of intact versus fractured rock zones comprising:
processing continuously acquired real-time blasthole drill performance data as an electric drilling machine operates in a drilling mode to drill a blasthole acquired using one or more electronic sensors deployed at or on the electric drilling machine;
offloading, via a wireless communication network, the acquired real-time blasthole drill performance data;
transforming the offloaded data into predefined standardized units; and processing the transformed data, said processing including compensating a plurality of blastability index ("BI") values for fractures based on the transformed data in order to determine fracture and/or relative rock hardness of the intact zones of the blasthole.

13. The method according to claim 12,
wherein said processing the continuously acquired real-time blasthole drill performance data and said offloading the acquired real-time blasthole drill performance data are performed by a high sampling frequency data acquisition sub-system that, includes hardware and firmware configured to implement continuous, real-time collection of blasthole drill performance data during drilling,
wherein said transforming and said processing the transformed data are performed by a data analytics sub-system that includes a computing platform and embedded software, and
wherein the high sampling frequency data acquisition sub-system offloads the acquired real-time blasthole drill performance data to the data analytics sub-system via the wireless communications network.

14. The method according to claim 12, further comprising continuously acquiring the blasthole drill performance data in real time as the electric drilling machine operates in the drilling mode to drill the blasthole using the one or more electronic sensors deployed at or on the electric drilling machine.

15. The method according to claim 12, further comprising storing, in computer memory, data corresponding to the determined fracture and/or relative rock hardness of the intact zones for the blasthole.

16. The method according to claim 12, further comprising determining a blasting pattern for the blasthole based on the determined fracture and/or relative rock hardness of the intact zones of the blasthole.

17. The method according to claim 12, wherein said processing to determine the fracture and/or relative rock hardness of the intact zones is based on previous blasthole and/or pattern information and/or geological information applied to refine the compensating of the BI values.

18. The method according to claim 12, wherein said compensating the BI values is based on determination of one or more corresponding specific fracture energy (SFE) values determined using the transformed data.

19. The method according to claim 12, wherein said offloading includes offloading all of the acquired blasthole drill performance data after a drilling operation for the electric drilling machine has been determined to have stopped and the blasthole has been completed.

20. The method according to claim 12, further comprising performing post-processing of the blasthole drill performance data to be used to determine a blast charge pattern including a type and placement of one or more explosive charges for the blasthole using a software tool.

* * * * *